United States Patent
Greenaway et al.

(10) Patent No.: US 6,975,457 B1
(45) Date of Patent: Dec. 13, 2005

(54) THREE-DIMENSIONAL IMAGING SYSTEM

(75) Inventors: Alan H Greenaway, Malvern (GB); Paul M Blanchard, Malvern (GB)

(73) Assignee: QinetiQ Limited, London (GB)

( * ) Notice: Subject to any disclaimer, the term of this patent is extended or adjusted under 35 U.S.C. 154(b) by 297 days.

(21) Appl. No.: 09/622,405

(22) PCT Filed: Mar. 5, 1999

(86) PCT No.: PCT/GB99/00658

§ 371 (c)(1),
(2), (4) Date: Aug. 17, 2000

(87) PCT Pub. No.: WO99/46768

PCT Pub. Date: Sep. 16, 1999

(30) Foreign Application Priority Data

Mar. 10, 1998 (GB) .............................. 9804996
Dec. 23, 1998 (GB) .............................. 9828365

(51) Int. Cl.[7] .............................................. G02B 27/44
(52) U.S. Cl. ........................................ 359/565; 359/15
(58) Field of Search .................... 359/15, 16, 565; 369/112.01, 112.03, 94

(56) References Cited

U.S. PATENT DOCUMENTS

| | | | |
|---|---|---|---|
| 3,781,110 A | 12/1973 | Leitz et al. | |
| 3,861,784 A | * 1/1975 | Torok | ......................... 359/573 |
| 4,467,188 A | 8/1984 | Suzuki et al. | |
| 4,701,005 A | 10/1987 | Noguchi | |
| 4,849,825 A | 7/1989 | Kurata et al. | |
| 5,115,423 A | 5/1992 | Maeda et al. | |
| 5,278,817 A | 1/1994 | Maeda et al. | |
| 5,453,963 A | * 9/1995 | Katayama et al. | ........ 369/44.23 |
| 5,526,336 A | * 6/1996 | Park et al. | ...................... 369/94 |
| 5,684,762 A | * 11/1997 | Kubo | ........................... 369/13 |
| 5,721,629 A | * 2/1998 | Lee | .............................. 359/15 |
| 5,760,959 A | 6/1998 | Michel et al. | |
| 5,838,496 A | 11/1998 | Maruyama et al. | .......... 359/565 |
| 5,838,651 A | 11/1998 | Takahashi | |
| 5,892,748 A | 4/1999 | Kikuchi | ....................... 369/112 |
| 5,930,220 A | * 7/1999 | Shimano et al. | .......... 369/44.23 |
| 5,933,277 A | 8/1999 | Troxell et al. | |
| 6,043,935 A | 3/2000 | Lee | |

FOREIGN PATENT DOCUMENTS

| | | |
|---|---|---|
| EP | 0 517 491 A | 12/1992 |
| JP | 08-043759 | 2/1996 |
| JP | 08 249707 A | 9/1996 |
| JP | 09 179020 A | 7/1997 |

* cited by examiner

*Primary Examiner*—Drew A. Dunn
*Assistant Examiner*—Alessandro Amari
(74) *Attorney, Agent, or Firm*—Nixon & Vanderhye P.C.

(57) ABSTRACT

A three-dimensional imaging system is described which exploits the defocusing of non-zero diffraction order images caused by the quadratic distortion of a diffraction grating (4). An optical system (1) is used such that objects (5, 6 and 7), located at different distances from grating (4), are imaged simultaneously and spatially separated on a single plane B.

21 Claims, 23 Drawing Sheets

(a)          (b)

(a)           (b)

| Detector Position Expressed as Defocus | Raw Image | Normalised Image |
|---|---|---|
| −1.5λ |  |  |
| −0.5λ |  |  |
| 0 |  |  |
| 0.5λ |  |  |
| 1.5λ |  |  |
| 2.0λ |  |  |

| Object Position | Raw Image — Diffraction Order | | | Normalised Image — Diffraction Order | | |
|---|---|---|---|---|---|---|
| | -1 | 0 | +1 | -1 | 0 | +1 |
| 5 |  | | |  | | |
| 6 |  | | |  | | |
| 7 |  | | |  | | |

| Detector Position | Raw Image — Diffraction Order −1, 0, +1 | Normalised Image — Diffraction Order −1, 0, +1 |
|---|---|---|
| A | | |
| B | | |
| C | | |

Figure 13

THREE-DIMENSIONAL IMAGING SYSTEM

This application is the U.S. national phase of international application PCT/GB99/00658, filed in English on Mar. 5, 1999 which designated the U.S. PCT/GB99/00658 claims priority to GB Application Nos. 9804996.8 and 9828365.8. The entire contents of these applications are incorporated herein by reference.

BACKGROUND OF THE INVENTION

1. Field of the Invention

The current invention concerns a system for imaging simultaneously multiple layers within a three-dimensional object field and has applicability in fields including optical information storage, imaging short-timescale phenomena, microscopy, imaging three-dimensional object structures, passive ranging, laser beam profiling, wavefront analysis and millimeter wave optics.

2. Discussion of Prior Art

The use of an undistorted amplitude grating to produce identical images of a scene in several diffraction orders is known. Most of the energy is concentrated in the zero order with most of the remaining energy being contained in the +1 and −1 orders. Phase or phase and amplitude gratings may be used to change the distribution of energy in the different diffraction orders.

It is also known that distortions of such a grating (i.e. dislocations in a direction perpendicular to the grating lines) may be used to produce phase changes in the optical system and thus shape the wavefront in the back focal plane of the system. This effect has been used to separate redundant baselines in a masked-aperture system using a dislocated grating and has formed the basis for computer generated holograms for many years (P M Blanchard, A H Greenaway, R N Anderton, R Appleby, 'Phase calibration of arrays at optical and millimeter wavelengths', J. Opt. Soc. Am. A., Vol 13, No. 7, pp1593–1600, 1996; G Tricoles, 'Computer generated holograms: an historic review', Appl. Opt., Vol 26, No. 20, pp4351–4360, 1987 and M Li, A Larsson, N Eriksson, M Hagberg, Continuous-level phase only computer generated holograms realised by dislocated binary gratings', Opt. Lett., Vol. 21, No 18, pp1516–1518, 1996).

The imaging of a three-dimensional object using a 'through-focal series' is also known. By this method a sequence of images of the object are taken with the optical system focused on different planes in the object field. An alternative approach forms simultaneously a matrix of images recorded through a matrix of lenses, each of which provides a different focus condition.

A disadvantage of the 'through-focal series' is that because the images are recorded sequentially it is ill-suited to imaging the three-dimensional structure of dynamic processes. A disadvantage of the second approach is its complex design and that the resolution obtained is limited to the resolution delivered by the individual lenses in the array, the diameter of each of which (thus image resolution) is constrained by the space into which the array may be packed.

The storage of data in three dimensional, optically readable, storage medium is also known (S Jutamulia and G M Stori, 'Three-Dimensional Optical Digital Memory', Optoelectronics—Devices and Technologies Vol 10, No. 3, pp343–360, 1995 and K Kobayashi and S S Kano, 'Multi-Layered Optical Storage with Nonlinear Read/Write', Optical Review, Vol 2, No 1, pp20–23, 1995). These papers review the media and architecture for various three dimensional optical memories.

In a high performance, near diffraction limited optical system such as a compact disk player, all sources of wavefront aberrations must be considered. In a standard compact disk, the data layer is covered with a substrate several hundred microns thick. Propagation of light through this substrate (which is essentially a parallel plate) introduces spherical aberration, increasing the spot size on the data layer and degrading resolution. This effect is overcome in conventional, single layer, compact disk systems by building spherical aberration correction into the objective lens.

In a multi-layer optical data storage medium the degree of spherical aberration is dependent on the depth of the data layer in the storage medium, hence when reading from each distinct layer a different level of spherical aberration correction is required. An aberration corrected objective lens is therefore not sufficient. Several patents on multi-layer optical data storage systems, which rely on a moving lens to focus at different depths, have suggested ways of performing 'active' spherical aberration correction. U.S. Pat. No. 5,202,875 suggests using a stepped block of substrate material which is moved across the optical beam (using a voice coil motor) to a position dependent on the layer being read, such that the thickness of material that the beam passes through is constant. Other suggestions include a pair of prisms, one of which is translated, a rotating disk of variable thickness and movable compensation plates.

All of these approaches introduce additional moving parts and complexity into the system.

SUMMARY OF THE INVENTION

According to this invention, an apparatus for producing simultaneously a plurality of spatially separated images from an object field comprises:

an optical system arranged to produce an image associated with a first focus condition;

a diffraction grating arranged to produce, in concert with the optical system, images associated with each diffraction order and means for detecting the images;

wherein the optical system, diffraction grating and detecting means are located on an optical axis and the diffraction grating is located in a suitable grating plane and is distorted substantially according to a quadratic function so as to cause the images to be formed under various focus conditions.

In addition, the function may be include terms to produce different amounts of spherical aberration in each diffraction order. This could be used to correct for spherical aberration in the associated optical system, for example the spherical aberration associated with layers at different depths in an optical data storage medium could be corrected.

The origin of the distortion function may be displaced from the optical axis. This feature could be used to cause alignment along the optic axis of the images associated with each diffraction order.

The grating could be a single grating or could be constructed from a combination of two or more gratings.

A variety of grating types could be used in the current invention for example, amplitude only; phase only; a combination of amplitude and phase; polarisation sensitive; a combination of two gratings sensitive to different polarisations; programmable; reflective; transmissive; two-level (binary); multi-level (digitised) or continuous-level (analogue).

By one implementation, images of loci of different depth within the object field (i.e. of different object planes) can be produced simultaneously on a single image plane. This would allow simultaneous reading of optical data stored in different layers within a suitable storage medium (e.g a multi-layer CD-ROM).

By an alternative implementation, images of a single plane in the object field (i.e. of a single object plane) can be produced simultaneously on a number of different image planes. This would allow focusing of a single illumination source on a number of different planes.

The above two implementations can be combined to provide a system in which the object planes of the former are coincident with the image planes of the latter and hence are suitably illuminated to facilitate imaging.

In a preferred embodiment the object planes contain data storage elements and can be imaged and, more preferentially, can be illuminated by the current invention. This embodiment could be used to read data from a three dimensional optical storage medium.

Another embodiment includes a dispersive system for introducing an offset to an input beam of radiation without altering the direction of the beam, said offset being perpendicular to the optical axis and proportional to the wavelength of the input radiation. This causes the diffraction angles at all angles to be substantially equal.

The invention utilises a single lens or multiple lens system with a distorted diffraction grating to produce simultaneously a set of images of the object field in which each image in the set can correspond to an image of the object field recorded under different focus conditions but in which the full diameter of the lens system is exploited in each image in the set. For each image in the set, the resolution, magnification and depth of focus is that which would have been obtained if a through focal series had been produced by varying only the focal length of the lens system.

The grating used can be a single distorted diffraction grating or a series of such gratings. The gratings used may be produced by computer-generated (digitised in space and/or in amplitude) or by analogue (e.g. interferometric) means.

In the following descriptions detector means a detection means comprising a spatially-resolving system such as a pixellated array of detector elements e.g. a charge coupled device (CCD). For applications where detection of the presence or absence of unresolved targets is required, the detector may comprise suitably-positioned, isolated detector elements.

BRIEF DESCRIPTION OF THE DRAWINGS

The invention will now be described with reference to the following figures in which:

FIG. 13 shows simultaneous side-by-side images of 3 objects located in different object planes;

FIG. 15 shows a comparison of phase profiles and grating structures for gratings with defocus, spherical aberration and both built in;

DETAILED DISCUSSION OF EMBODIMENTS

Although the following examples relate to application of the invention in the field of optics, this should not be seen as limiting as the general principles of the invention are applicable to other wavelengths of electromagnetic radiation.

Grating Location

Figure 1:
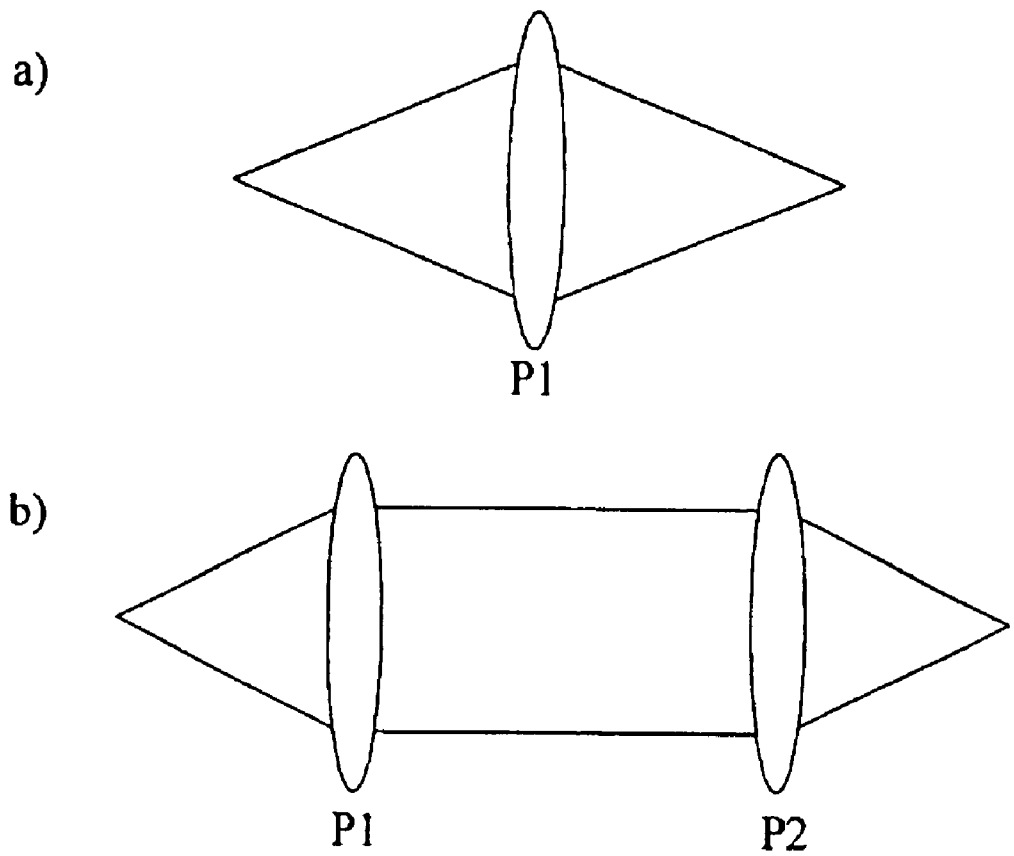
FIG. 1 shows schematically suitable grating planes, by way of illustration only.

In a system in which converging and/or diverging beams exist, a suitable grating plane would be any plane that is normal to the optical axis and close to a lens other than a lens positioned in the image or object field, for example plane P1 in FIG. 1a. In a system where a collimated beam is produced, a suitable grating plane would be any plane that is normal to the optical axis of the system and in the region in which the beam is collimated, for example anywhere between planes P1 and P2 in FIG. 1b, or a plane described as a suitable grating plane for a system with converging or diverging beams.

Grating Design

The design of distorted gratings which might typically be used in the current invention will first be described.

Figure 2:
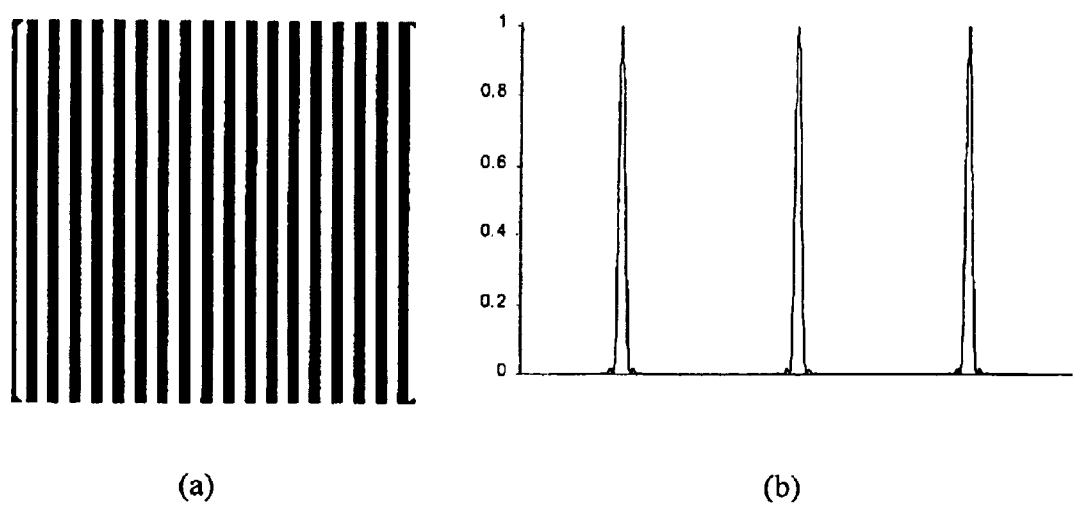
FIG. 2(a) shows schematically a conventional, undistorted, amplitude-only diffraction grating used in an imaging system
FIG. 2(b) shows the normalised intensity cross-section of the zero, +1 and −1 diffraction order images of a point source produced when such a grating is inserted in a suitable grating plane of an imaging system.

A standard diffraction grating consists of alternate regularly spaced strips of different transmissivity, reflectivity or optical thickness. When the grating is used within an imaging system, multiple diffraction orders appear in the image plane in addition to the unscattered zero order. Each diffraction order contains the same information about the object field as the zero order, though with different levels of intensity dependent on details of the grating construction. FIG. 2 shows, as an example, an amplitude grating and the images of a point object formed in the −1, 0 and +1 diffraction orders. (each order normalised to unit intensity).

Figure 3:
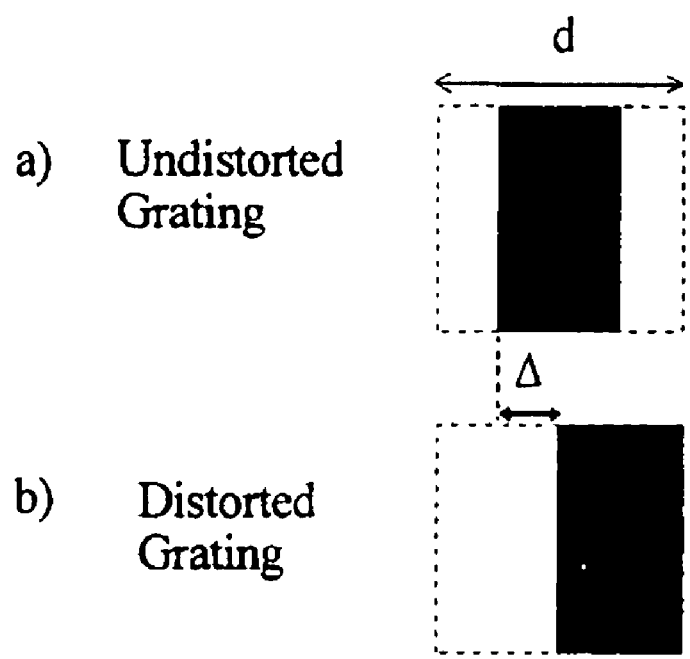
FIGS. 3a and 3b illustrate respectively a section of an undistorted grating and the distortion of a grating by a fixed amount, $\Delta$.

If the grating geometry is distorted locally, by a displacement of the strips in a direction perpendicular to their long axis, a phase shift is introduced in the wavefront scattered from the distorted region, the level of which is dependent on the amount of local distortion of the grating relative to its undistorted form. The level of local phase shift is related to the distortion of the grating through equation 1, $$\phi = \frac{2\pi m \Delta}{d} \qquad \text{Equation 1}$$

where d is the grating period, m is the diffraction order into which the wavefront is scattered and $\Delta$ is the distortion of the grating strips relative to their undistorted position, as shown in FIG. 3. Such a distortion of the grating produces phase shifts of equal magnitude but opposite sign in the wavefronts scattered into +1 and −1 diffraction orders and leaves the unscattered wavefront in the zero order unaltered.

It is important to note that this technique allows continuous phase values to be encoded using a binary (two level) grating, although the invention can also be applied to multiple or continuous level gratings.

For applications using computer-generated holograms, the distorted grating can be designed by dividing the grating area into a number of cells, which can be of any space-filling shape, and calculating the degree of distortion to be applied to the grating for each cell individually. Alternatively the distortion can be applied to the grating as a whole leading to continuously distorted strips. Both of these approaches can be implemented using computer design followed by grating fabrication or by using an electrically addressed liquid crystal or other electro-optic device.

For non-digital production methods an alternative technique is to record holographically the distorted fringe pattern into an optically sensitive medium, or to use an optically programmable liquid crystal device to allow the grating to be changed in real-time.

The above descriptions refer to arbitrary distortions that could be used to generate arbitrary phase changes on the wavefront scattered into a selected diffraction order.

Below are described the grating distortions required to produce the defocus effects required for implementation of this invention.

Defocus Gratings

A defocused optical system has a phase shift which compared to an in-focus image, can be represented by a quadratic function of the distance from the optical axis and measured relative to the Gaussian reference sphere (e.g. section 5.1, Principles of Optics, Born & Wolf, Pergammon, Edition 6, Oxford, 1980). This invention relates to a diffraction grating distorted as a quadratic function of distance from the optical axis of the system according to, $$\Delta(x, y) = \frac{_0C_{20}d}{\lambda R^2}(x^2 + y^2) \qquad \text{Equation 2}$$

where $\Delta(x,y)$ is a distortion in a direction perpendicular to the grating lines (FIG. 3), x and y are Cartesian co-ordinates relative to an origin on the optical axis in the plane of the grating, d is the grating period, $\lambda$ is the optical wavelength, $_0C_{20}$ is the degree of defocus introduced into the image formed in the +1 diffraction order ($_0C_{20} \geq 0$) and R is the radius of the grating aperture which is centred on the optical axis. In equation 2 a circular aperture has been assumed, but the invention can be applied to an aperture of any shape. $_0C_{20}$ is the wavefront coefficient of defocus of the grating (the traditional defocus aberration constant equivalent to the pathlength difference introduced at the edge of the aperture between, in this case, the wavefront scattered into the +1 diffraction order and the Gaussian reference surface for that diffraction order {e.g. section 15-5, Geometrical and Physical Optics, R S Longhurst. Longman, Edition 3, London, 1973}). The phase change imposed on the wavefronts scattered into the various diffraction orders can be calculated by combining equation 1 and equation 2 to give, $$\phi(x, y) = m\frac{2\pi_0 C_{20}}{\lambda R^2}(x^2 + y^2) \qquad \text{Equation 3}$$

The quadratic phase function (equation 3) imparts a phase delay on wavefronts scattered into the non-zero diffraction orders such that the wavefront curvature is altered. The grating therefore has focussing power in the non-zero orders, and an equivalent focal length ($f_m$) can be defined for these orders, $$f_m = \frac{R^2 - (m_0 C_{20})^2}{2m_0 C_{20}} \qquad \text{Equation 4}$$

In practice it is more useful to use such a grating as part of an optical system which provides the majority focussing power with the grating effectively modifying the focal length of the lens in each diffraction order. For example, when a quadratically distorted grating is placed in contact with a lens of focal length f, the focal length of the combination in each diffraction order is given by, $$f_m = \frac{f(R^2 - m_0^2 C_{20}^2)}{R^2 + 2fm_0 C_{20} - m_0^2 C_{20}^2} \qquad \text{Equation 5}$$

which can be approximated by $$f_m = \frac{fR^2}{R^2 + 2fm_0 C_{20}} \qquad \text{Equation 6}$$

when $R^2 \gg m^2_0 C_{20}$. The magnitude and sign of the defocus is dependent on the diffraction order (m). Thus a series of images of the object field with differing defocus conditions is produced simultaneously and side-by-side on the detector in the different diffraction orders.

Figure 4:
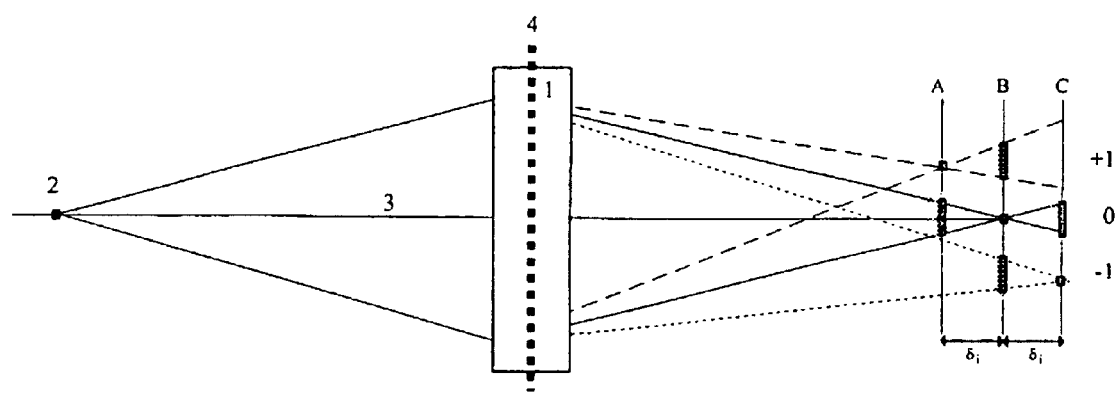
FIG. 4 shows schematically a simple imaging system of the current invention.

The principle of the invention can be demonstrated with reference to the −1, 0 and +1 diffraction orders. Referring to FIG. 4, the defocusing effect of a quadratically distorted grating can be demonstrated using an optical system (1), designed and arranged to image an object (2) on the optical axis (3) onto detector plane B at the normal focal plane of the optical system.

A quadratically distorted diffraction grating (4) which is added to the optical system (1) produces two additional images of the object (2) in plane B in its +1 and −1 diffraction orders. In the normal focal plane B the zero order image remains in focus, whilst the images in the +1 and −1 diffraction orders undergo defocus of equal magnitude but opposite sign. If the detector is moved along the optical axis either side of plane B, a plane can be reached where the physical defocus cancels out the defocus introduced by the grating into the diffraction orders. In this way the images in the +1 and −1 diffraction orders can be brought in to focus (planes A and C).

The separation $\delta_i$ of the image planes A, B and C is determined by the grating distortion, the radius of the grating aperture and the optical system through, $$\delta_i \approx -\frac{2v^2 m_0 C_{20}}{2v m_0 C_{20} + R^2} \qquad \text{Equation 7}$$

where R is the grating aperture radius, v is the distance from the normal image plane (B) to the secondary principle plane of the optical system, and the approximation $R \gg m_0 C_{20}$ (R is much greater than $m_0 C_{20}$) has been made. Note that if a grating is designed with defocus represented by $_0C_{20}=n\lambda$, then the +1 diffraction order undergoes a defocus equivalent to $n\lambda$, the −1 diffraction order will undergo a defocus equivalent to $-n\lambda$ and, through equation 7, planes A and C will be located either side of and at different distances from plane B.

In the case where $2v m_0 C_{20} \ll R^2$, equation 7 can be approximated by, $$\delta_i \approx -2m\left(\frac{v}{R}\right)^2 {_0C_{20}} \qquad \text{Equation 8}$$

and planes A and C are symmetrically placed about plane B.

Equation 7 can be rearranged in terms of the grating defocus ($_0C_{20}$) needed to generate the required image plane separation ($\delta_i$) between in-focus images in the zero and +1 diffraction orders (m=1), $$_0C_{20} = \frac{R^2 \delta_i}{2v(v+\delta_i)} \qquad \text{Equation 9}$$

Figure 5:
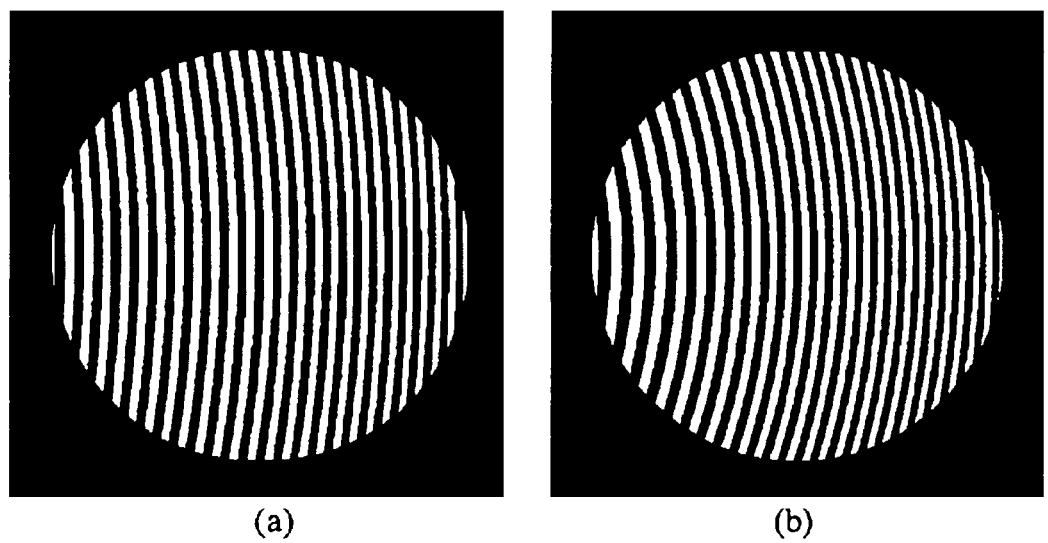
FIG. 5 shows two computer generated amplitude gratings with quadratic distortion.

FIGS. 5(a) and 5(b) each show examples of gratings with spherical apertures and R=12.5d, distorted as a quadratic function of distance from the centre, to give different levels of defocus, for FIG. 5(a), $_0C_{20}=\lambda$ and for FIG. 5(b), $_0C_{20}=2\lambda$. These represent two examples of many possible grating structures and were designed by computer as binary amplitude gratings using a square design cell. The distinct steps in the black grating line edges are due to the $\lambda/20$ accuracy to which these gratings have been plotted. The grating lines associated with quadratically distorted gratings are arcs of concentric circles of different thickness and could be plotted as such.

The defocusing property of these gratings has been verified with computer simulations and experimentally as will be described later.

Figure 6:
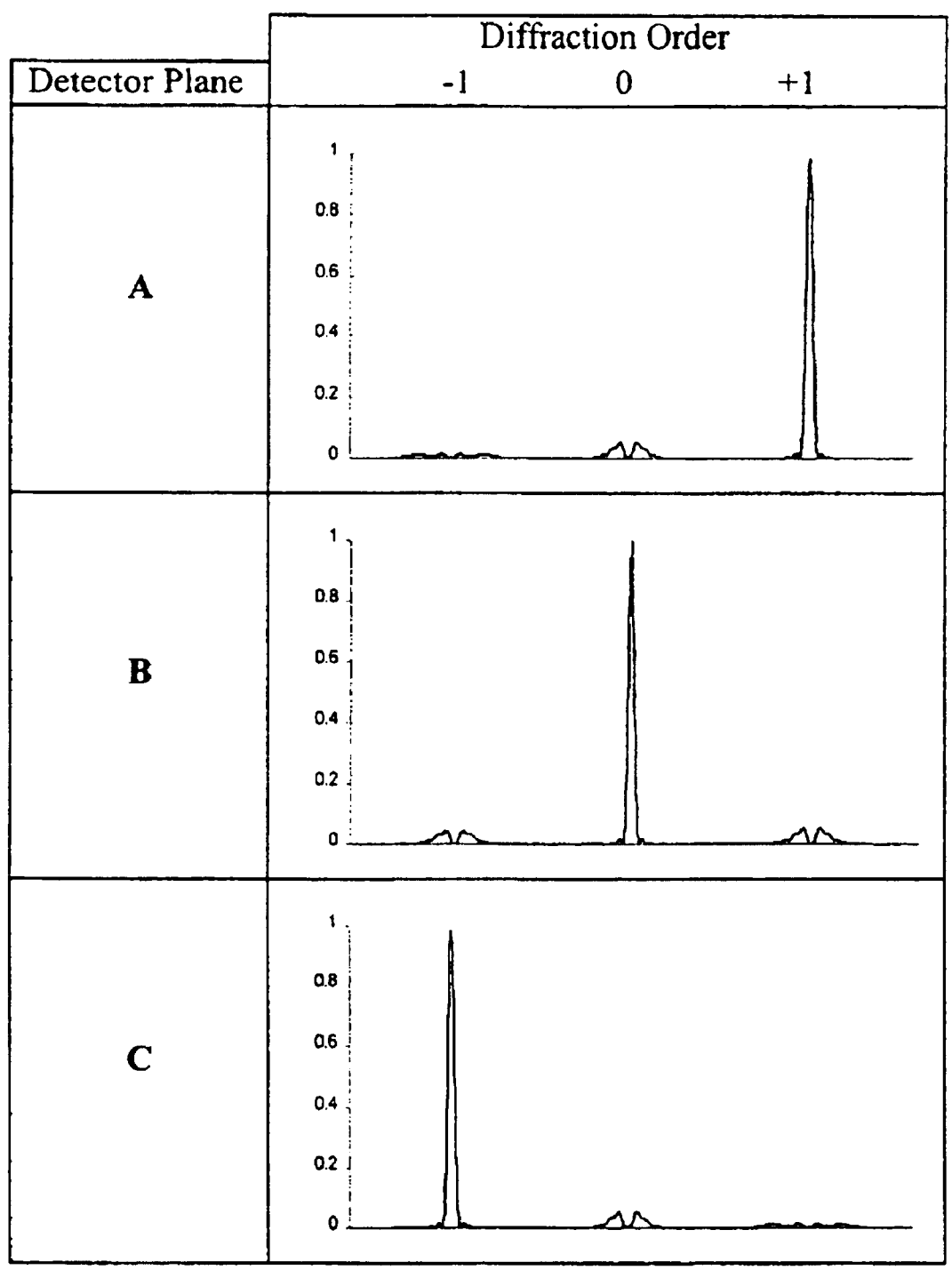
FIG. 6 shows computer simulations of the intensity cross-sections of images of a point source, formed in the +1, 0 and −1 diffraction orders by the current invention.

Imaging a Single Object Through a Quadratically Distorted Grating—Computer Simulations Computer simulations were performed using software written in Fortran using a Fast Fourier Transform (FFT) routine [Subroutine fourn from 'Numerical recipes in Fortran' W H Press, S A Teukolsky, W T Vetterling, B P Flannery, Cambridge University Press, 1992]. Images were calculated by multiplying the FFT of the object by the optical transfer function of the grating, followed by an inverse FFT to generate the image. The optical transfer function of the grating was calculated from the autocorrelation of the grating, obtained via a double FFT technique using the Wiener-Khintchine Theorem [Fourier Optics: An Introduction, E G Steward, $2^{nd}$ edition, p95, J Wiley & Sons.]. This approach represents a simulation of incoherent imaging. FIG. 6 shows intensity cross-sections of simulated images of a point source through a distorted amplitude grating designed with $_0C_{20}=\lambda$ (FIG. 5a), with the detector placed at planes A, B and C (FIG. 4). Using an amplitude grating, the intensities of the first order diffraction spots would, in practice, be lower than that of the zero order. In this figure the power in in-focus diffraction orders has been normalised to unity to aid observation. With the detector in plane B, the zero order is in focus and the +1 and −1 diffraction orders have defocuses of +1$\lambda$ and −1$\lambda$ respectively. By moving the detector either side of this plane, the +1 and −1 diffraction orders can be brought into focus. This demonstrates that the mask is generating a true defocus.

Imaging a Single Object Through a Quadratically Distorted Grating—Experimental Results In order to verify the computer simulations, a grating was fabricated by photographically reducing an enlarged black and white picture of the appropriate pattern on to a 35 mm slide. This provided a grating with a circular aperture of diameter 1 cm, $_0C_{20}=\lambda$ and a grating period of $400 \times 10^{-6}$ m (400 $\mu$m). The optical system comprised two lenses with focal lengths of 50 cm and 100 cm, separated by 5 cm. The object, a standard resolution target, was placed one focal length (50 cm) in front of the first lens and the detector was placed one focal length (100 cm) behind the second lens. A white light source was used to illuminate the object in transmission and the grating was placed between the two lenses in the region where the light was collimated. A filter with a bandpass of 10 nm, centred at 650 nm, was placed in front of the CCD detector used to record the image.

Figure 7:
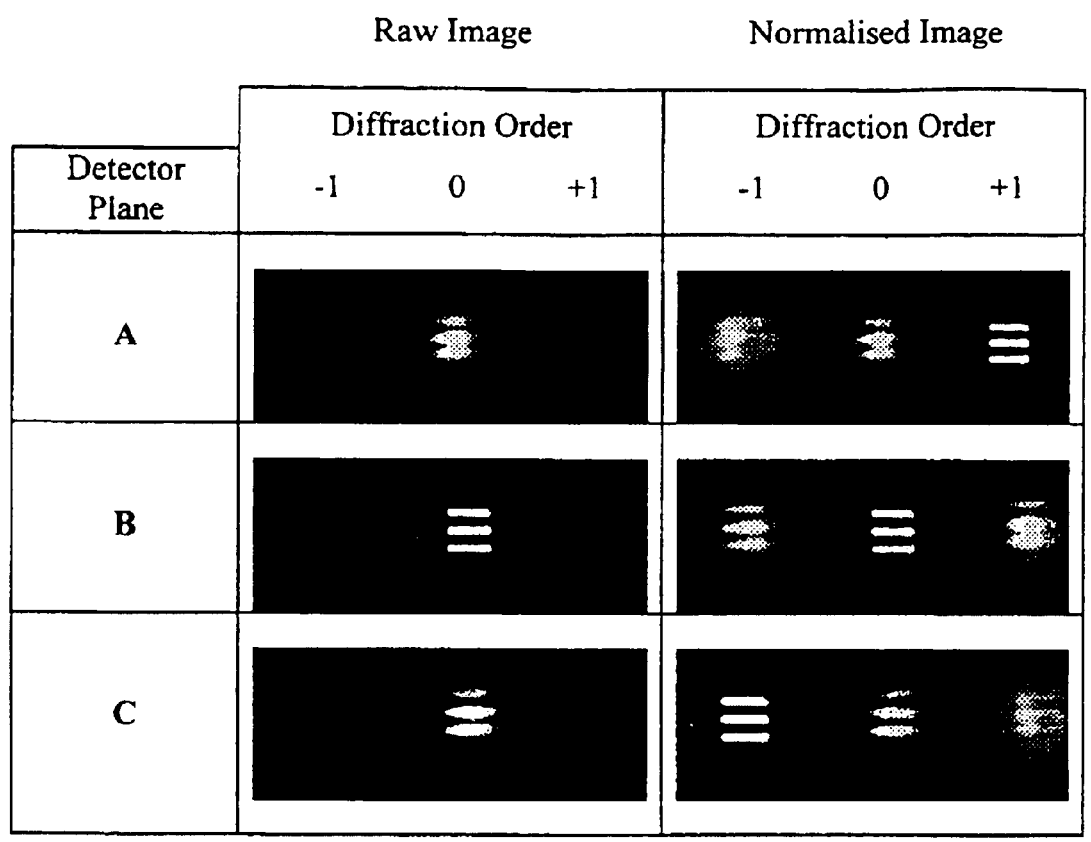
FIG. 7 shows experimental measurements of the images of a resolution target formed in the +1, 0 and −1 diffraction orders by the current invention.

These parameters lead to an axial focal shift of −4.9 cm and +5.5 cm in the +1 and −1 diffraction orders respectively (equation 7). FIG. 7 shows the images obtained upon location of the detector at positions corresponding to planes A, B and C of FIG. 4. The figure shows the raw images captured by the detector and the same images after processing to increase the intensities of the +1 and −1 diffraction orders (normalised), to aid observation. It can be seen that the −1, 0 and +1 diffraction orders are brought into focus as the detector is scanned along the optical axis of the system. At these positions, the physical defocus is cancelling out the wavefront deformations introduced by the gratings, that is the grating is introducing the quadratic variation of phase (defocus) predicted.

Imaging a Single Object Through Two Crossed Quadratically Distorted Gratings

Figure 8:
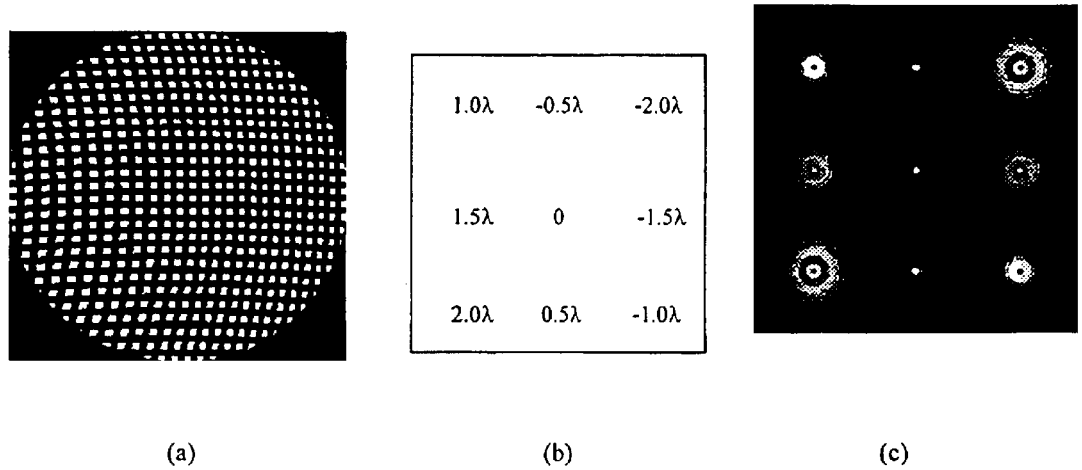
FIG. 8(a) shows crossed amplitude gratings.
FIG. 8(b) shows the defocus states of the corresponding diffraction orders and FIG. 8(c) shows a computer simulation of the images of a point source through the grating structure of FIG. 8(a)

The techniques described so far can be extended by using multiple crossed gratings. If two gratings are crossed at right angles, the central nine diffraction orders can be usefully used. If the defocuses ($_0C_{20}$) of the two crossed grating are chosen to be $a\lambda$ and $b\lambda$ then, for $|a-b| \neq a \neq b$, the nine images of the scene that are formed in parallel correspond to nine different defocus conditions. FIG. 8a shows an example of two crossed gratings having defocuses of $_0C_{20}=0.5\lambda$ and $_0C_{20}=1.5\lambda$, FIG. 8b shows the relative defocuses of the central nine diffraction orders and FIG. 8c shows a computer simulation of the image of a point source through the gratings (normalised). The image of the object in each diffraction order can be brought separately into focus by movement of the detector along the axis.

Figure 9:
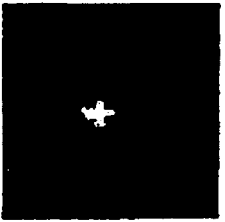
FIG. 9 shows experimental images of a resolution target obtained at different detector positions using crossed amplitude gratings.
Figure 9:
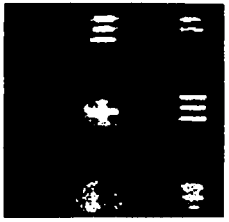
Figure 9:
Figure 9:
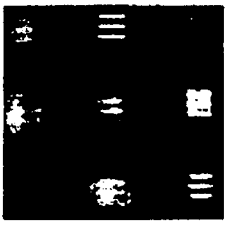
Figure 9:
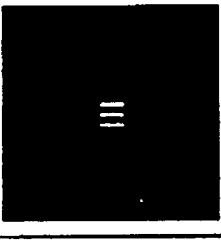
Figure 9:
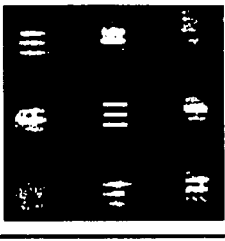
Figure 9:
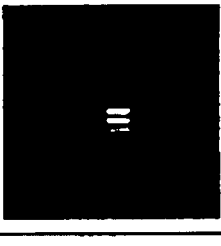
Figure 9:
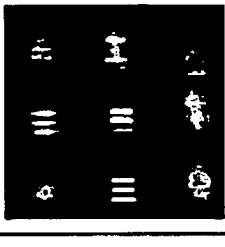
Figure 9:
Figure 9:
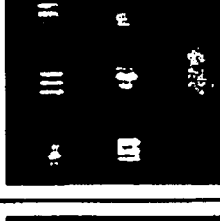
Figure 9:
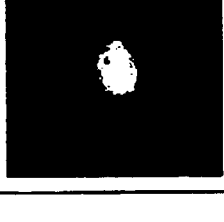
Figure 9:
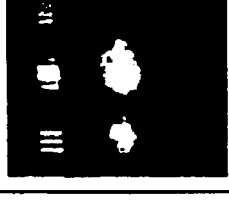

The crossed grating technique has been tested experimentally using the arrangement previously described and the crossed grating structure illustrated in FIG. 8a. The experimental results in FIG. 9 show a selection of the nine images, brought into focus by moving the detector along the optical axis. The full range of motion of the detector between the two extremes in FIG. 9 was approximately 20 cm.

Imaging Multiple Object Planes Through a Quadratically Distorted Grating

Figure 10:
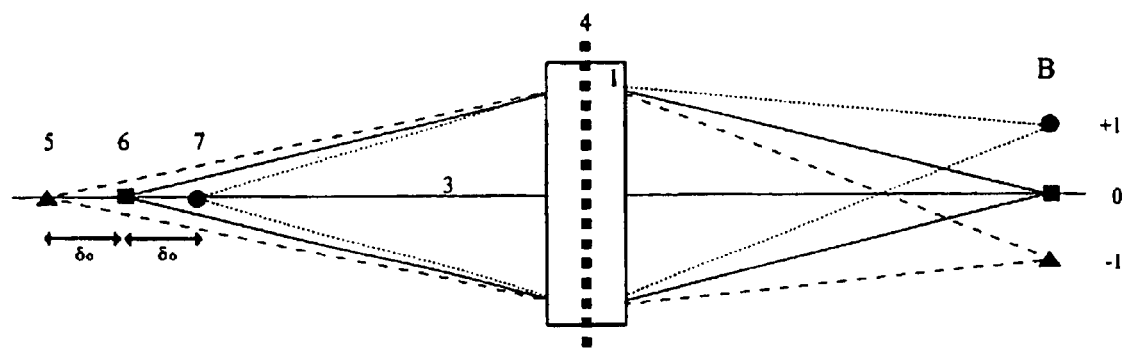
FIG. 10 shows schematically a simple imaging system of the current invention used to produce in-focus images of different object planes at a single detector plane.

The function of the defocus grating can be considered in a different way. Referring to FIG. 10, if the detector is placed at image plane B, then the three images formed correspond to in-focus images of three different object planes 5, 6 and 7. The zero order will be the sum of the out-of-focus images of objects 5 and 7 and an in-focus image of object 6. If the degree of defocus is sufficient, a good image of object 6 will result. Similarly, objects 5 and 7 are discernible in the +1 and −1 diffraction orders. The grating therefore generates, side-by-side, simultaneous images of three different object planes at a single detector plane. The separation ($\delta_o$) of the object planes imaged in plane B is determined by the grating distortion, the radius of the grating aperture and the optical system through, $$\delta_0 \approx -\frac{2u^2 m_0 C_{20}}{2u m_0 C_{20} + R^2} \qquad \text{Equation 10}$$

where $_0C_{20}$ is the wavefront coefficient of defocus of the grating for the +1 diffraction order, R is the grating aperture radius, m is the diffraction order, u is the distance from the central object plane to the primary principle plane of the optical system, and the approximation $R \gg m_0 C_{20}$ has been made.

The resolution in depth, in terms of the minimum separation of planes in the object field that can be individually imaged, is dependent on the depth of focus of the optical system being used. The image quality obtained when using a distorted diffraction grating to image multiple planes within the object field will be the same as if a 'through focal series' were obtained by adjusting the optical system to adjust its focus to image the same planes.

Figure 11:
FIG. 11 shows images of an object plane containing a slide of the letter 'B' obtained by experiment using a quadratically distorted amplitude grating.
Figure 11:
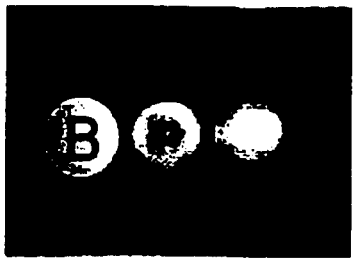
Figure 11:
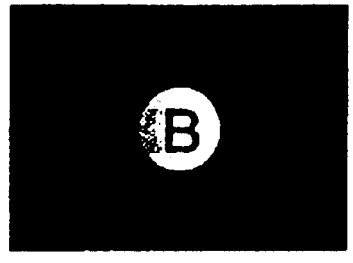
Figure 11:
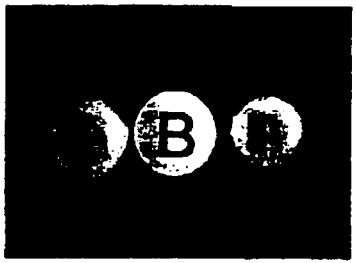
Figure 11:
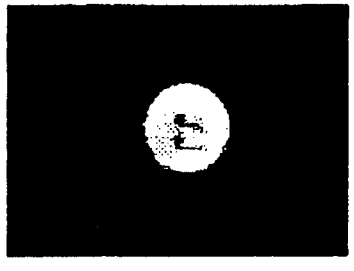
Figure 11:
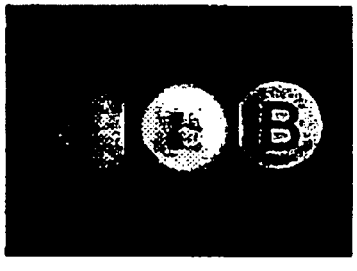

The fact that different object planes are imaged into different diffraction orders was first observed using a fixed detector and a single moveable object. FIG. 11 shows images obtained on locating a slide of the letter 'B' of height 1 mm (the object) at positions corresponding to object planes 5, 6 and 7 of FIG. 10. The optical system comprised a single lens with a focal length of 12 cm, a CCD detector fixed at 32 cm from the lens (plane B) and a grating with an aperture diameter of 2 cm, $_0C_{20}=10\lambda$ and a period of $100 \times 10^{-6}$ m (100 µm). Object plane 6 corresponded to a plane 19 cm from the lens and the grating parameters produced in-focus images in its −1 and +1 diffraction orders of object planes displaced by approximately ±4.8 mm relative to plane 6.

In order to demonstrate the simultaneous imaging of three object planes, the same optical system was used with three different objects. Three slides containing the letters 'A' 'B' and 'C' were placed at planes 5, 6 and 7 respectively as shown schematically in FIG. 12. Plane 6 corresponded to a plane 19 cm from the lens L1 and planes 5 and 7 corresponded to object planes displaced by +4.7 mm and −4.9 mm relative to plane 6. A white light source (not shown) was used to illuminate the objects in transmission, and a filter 9 centred at a wavelength of 650 nm, with a bandpass of 10 nm was located over the detector aperture. The detector (8) was also moved along the optical axis to the positions where the diffraction orders imaged different objects, corresponding to planes A and C in FIG. 4. These positions were approximately ±14 mm from the image plane B.

Figure 12:
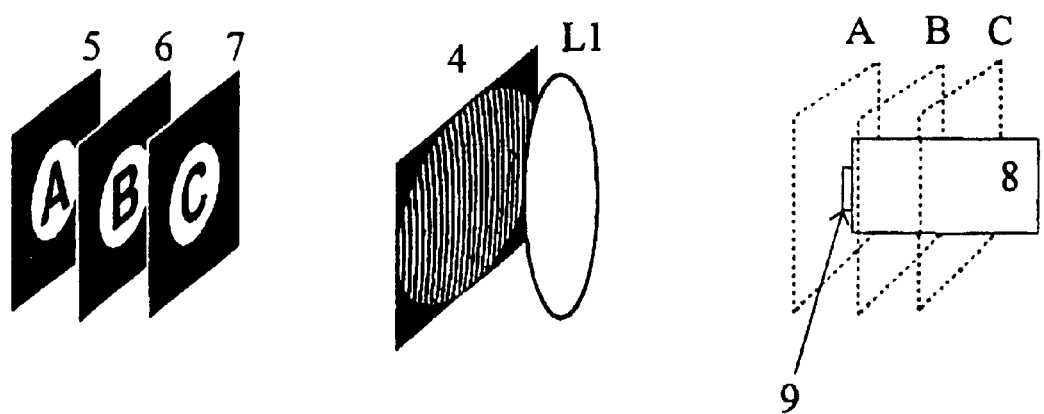
FIG. 12 shows schematically the apparatus used to record the experimental data shown in FIG. 13.

FIG. 13 shows the images recorded on the detector at planes A, B and C of FIG. 12. At position B, the zero order images object plane 6 (the letter 'B'), the +1 diffraction order images object plane 7 (the letter 'C') and the −1 diffraction order images object plane 5 (the letter 'A') of FIG. 12. These images demonstrate experimentally that three object planes can be imaged simultaneously and side-by-side on a single detector. With two crossed gratings it is possible to image simultaneously nine object planes side-by-side on a single detector.

Phase Gratings

If an amplitude grating is used as a defocusing element, the zero order is always brighter than the +1, −1 and higher diffraction orders. The distribution of energy can be adjusted using a phase grating with two phase levels. For example, a phase step of $\pi$ radians can completely eliminate the zero order, whilst putting more power into the +1 and −1 orders, or the phase step can be adjusted to $0.6397\pi$ to place equal power into the 0, +1 and −1 orders. With crossed gratings the use of more phase steps or combined amplitude and phase gratings can be used to adjust the intensities of the multiple diffraction orders.

Polarisation-Sensitive Gratings

A distorted grating that is fabricated such that it operates only on one polarisation state of the incident wavefront will produce polarised, defocused images of an object in the +1 and −1 diffraction orders and an unpolarised image in the zero order. If a second grating, that operates only on the orthogonal polarisation, is crossed with the first grating then two further diffraction orders will be produced, polarised in the orthogonal sense and displaced from the set produced by the first grating. Because the gratings are polarisation sensitive there is no crosstalk between the gratings and thus no diffraction orders are produced other than would be produced by each grating acting alone. If the system is required for polarimetric studies the defocus can be chosen to be the same for each polarisation state. Because the images are produced simultaneously the system is suitable for polarimetric studies of dynamically-changing scenes.

Three Dimensional Optical Data Storage.

Figure 14:
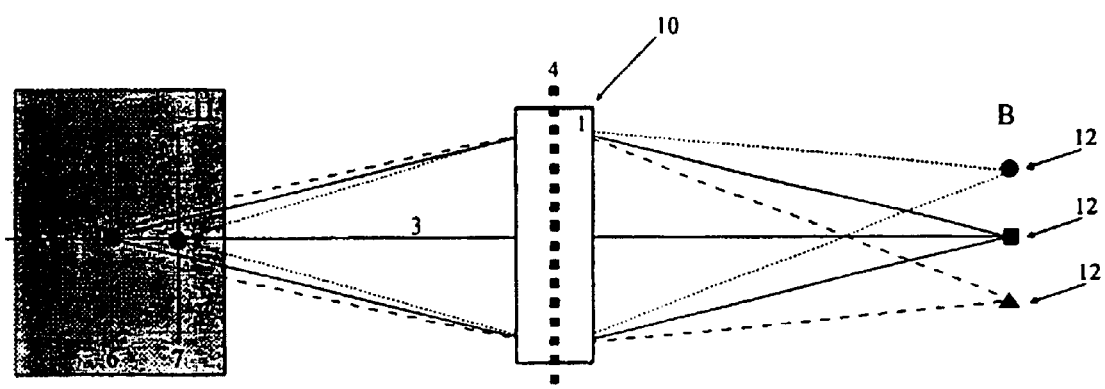
FIG. 14 shows how the invention may be adapted for reading of data stored in a three dimensional optical storage medium.

Referring to FIG. 14, apparatus of the invention, adapted for reading data stored in a three dimensional optical storage medium 11 is generally designated 10. The storage medium 11 comprises discrete optically readable planes 5, 6, 7 having individual data storage elements (not shown) located thereon and is illuminated by means not shown. The elements could, for example, be an area of the plane in which a hole or pit is used to designate a logical 1 and the absence of a hole or pit is used to designate a logical 0. However this example is not limiting: other embodiments are known to, or would be obvious to, persons skilled in the art including multi-level systems in which the elements may exist in more than the two states of a binary system. The data storage elements are imaged simultaneously at detectors 12. Detectors 12 are capable of producing a signal dependent on the state of the storage element and could be a photodiode or a photo transistor.

In order to facilitate interrogation of different data elements within each plane, the apparatus includes means (not shown) for effecting relative movement, in a direction perpendicular to optical axis 3, between the storage medium 8 and the rest of the apparatus. Such means might comprise an electromechanical arrangement known to a person skilled in the art.

Inclusion of Spherical Aberration Distortion Function

The phase profile of a diffractive element that imparts a spherical phase delay can be written as, $$\phi = \frac{2\pi}{\lambda}\left[f - \sqrt{f^2 - r^2}\right] \quad \text{Equation 11}$$

where f is the element focal length (or radius of curvature introduced) and r is a radial coordinate. This expression can be expanded as, $$\phi = \frac{2\pi}{\lambda}\left[\frac{r^2}{2f} + \frac{r^4}{8f^3} + \frac{r^6}{16f^5} + \ldots\right] \quad \text{Equation 12}$$

By using diffraction gratings that are quadratically distorted only the first term of this equation is being considered. The omission of higher order terms is equivalent to the standard paraxial approximation in which the inclination of a ray to the optical axis is assumed to be small (r<<f). In situations where this approximation is not valid it is appropriate to include in our grating distortion function terms in higher powers of $r^2$, which modify the quadratic grating distortion. In general the grating will remain substantially quadratically distorted, with the higher order terms acting as corrections to the grating distortion. The higher order terms in equation 12 are referred to here as spherical aberration terms and will be included in the wavefront aberration function ($W_{SA}$), written as, $$W_{SA}(r) = \underset{\text{primary}}{_0C_{40}r^4} + \underset{\text{secondary}}{_0C_{60}r^6} + {_0C_{80}r^8} + \ldots = \sum_{j=2}^{\infty} {_0C_{2j,0}r^{2j}} \quad \text{Equation 13}$$

where r is the distance from the optical axis.

The ability to generate different levels of spherical aberration in each diffraction order can be used not only to adjust the grating structure in the non-paraxial case, but also to correct for spherical aberration introduced by the object field, for example in multi-layer optical data storage systems.

For a beam entering a parallel plate of refractive index n, with zero tilt, the primary and secondary coefficients of spherical aberration are given by, $${_0C_{40}} = \frac{(n^2-1)}{8n^3}t(NA)^4 \quad {_0C_{60}} = \frac{(n^4-1)}{16n^5}t(NA)^6 \quad \text{Equation 14}$$

where t is the depth at which the beam is focused and NA is the numerical aperture of the beam (J Braat, 'Analytical expressions for the wave-front aberration coefficients of a tilted plan-parallel plate', Applied Optics. Vol.36, No.32, 8459,1998.). The linear dependence of spherical aberration on depth (t) means that all of the terms in equation 14 can be corrected with a suitably distorted diffraction grating. In the following discussion only the $_0C_{40}r^4$ term of equation 14 is considered, for clarity.

To eliminate spherical aberration the optical system 1 (without grating) of FIG. 14 can be designed to correct for the spherical aberration introduced on the beam focused on layer 6, as in a standard 1-layer compact disk read head. A diffraction grating distorted according to $r^4$ can then be designed with a wavefront coefficient of spherical aberration ($_0C_{40}$), such that the −1 diffraction order (associated with a spherical aberration correction of $-_0C_{40}$) is spherical aberration corrected for layer 7, the +1 diffraction order (associated with a spherical aberration correction of $+_0C_{40}$) is corrected for layer 5 and the zero order remains spherical aberration corrected for layer 6.

Table 1 shows the defocus and spherical aberration (first order only) terms, associated with each layer 5, 6 and 7 introduced into grating 4.

TABLE 1

| Layer | Diffraction Order | Grating Correction (Defocus) | Grating Correction (Spherical Aberration) |
|---|---|---|---|
| 5 | −1 | $-_0C_{20}$ | $-_0C_{40}$ |
| 6 | 0 | 0 | 0 |
| 7 | +1 | $+_0C_{20}$ | $+_0C_{40}$ |

The complete grating must incorporate both defocus and spherical aberration correction and will be distorted according to, $$\Delta(x,y) = \frac{d}{\lambda}\left[\frac{(x-x_0)^2 + (y-y_0)^2}{R^2}{_0C_{20}} + \frac{(x^2+y^2)^2}{R^4}{_0C_{40}} + \frac{(x^2+y^2)^3}{R^6}{_0C_{60}} + \text{higher order terms}\right] \quad \text{Equation 15}$$

where D(x,y) is a distortion in a direction perpendicular to the grating lines, d is the grating period, R is the radius of the grating aperture and x and y are Cartesian coordinates relative to an origin on the optical axis in the plane of the grating. The grating distortion D(x,y) introduces a phase shift onto the wavefront scattered from the grating into the $m^{th}$ diffraction order according to equation 1. $x_0$ and $y_0$ represent an offset of the origin of the quadratic distortion function from the optical axis of the system. Exploitation of such an offset is described later. Offsets of the spherical aberration terms in equation 15 ($_0C_{40}$, $_0C_{60}$ and higher terms) can not be exploited in the same manner and are not included in equation 15. Such distortion functions should be centred on the optical axis.

As an example, the level of spherical aberration to be corrected can be estimated by assuming a multi-layer optical storage medium with a refractive index of 1.5806 at a wavelength of 650 nm, a numerical aperture of 0.60 and layer separations of 100 μm. These parameters give additional spherical aberration of $_0C_{40}$=0.95λ and $_0C_{60}$=0.24λ from layer to layer (equation 15). (J Braat, 'Analytical expressions for the wave-front aberration coefficients of a tilted plan-parallel plate', Applied Optics. Vol.36, No.32, 8459,1998.).

Figure 15:
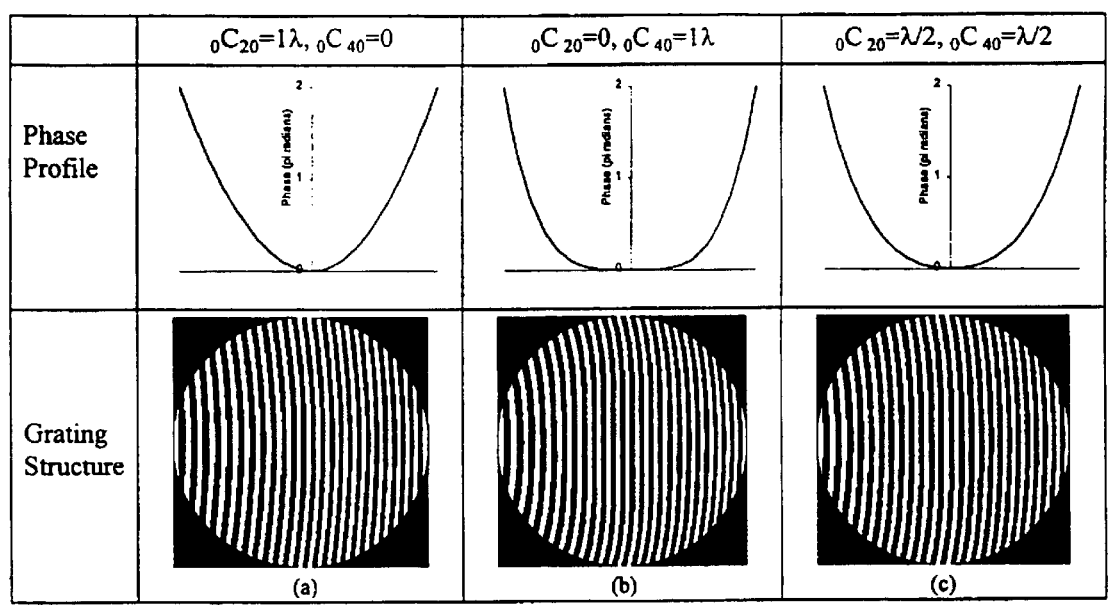

FIG. 15 compares the phase profiles and grating structures for gratings with defocus only (a), spherical aberration only (b) and defocus and spherical aberration (c) built in. The grating lines in (a) are arcs of circles, whereas those in (b) and (c) are not.

Figure 16:
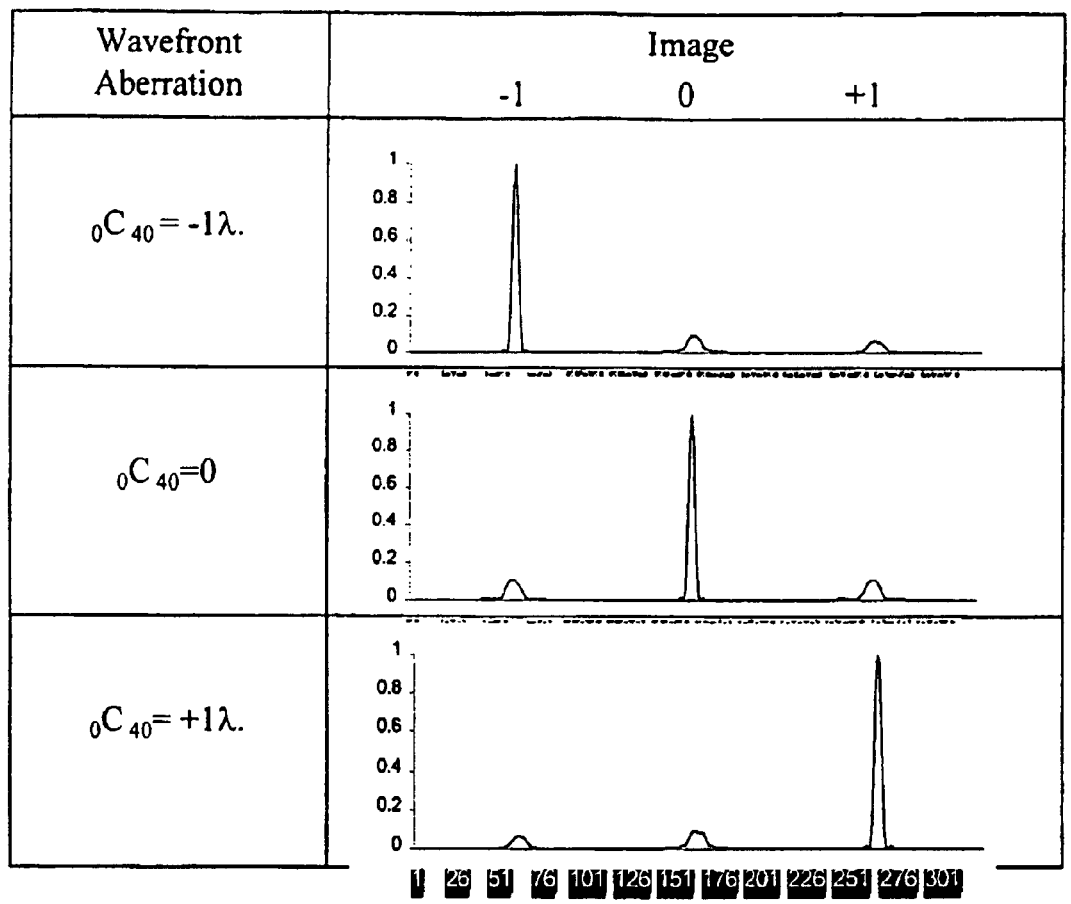
FIG. 16 shows qualitatively image cross-sections associated with −1, 0 and +1 diffraction orders through a grating with $_0C_{40}=1\lambda$.

The ability of a grating distorted according to $r^4$ to generate spherical aberration of equal magnitude but opposite sign in the +1 and −1 diffraction orders has been demonstrated in computer simulations. The simulation modelled a wavefront with specified levels of spherical aberration, incident on grating (b) of FIG. 15. FIG. 16 shows that when a wavefront aberration of one wave of spherical aberration is used, the image in the +1 diffraction order is corrected (the image is a diffraction limited spot), whereas when a wavefront with one wave of spherical aberration of opposite sign is used, the image in the −1 diffraction order is corrected.

Figure 17:
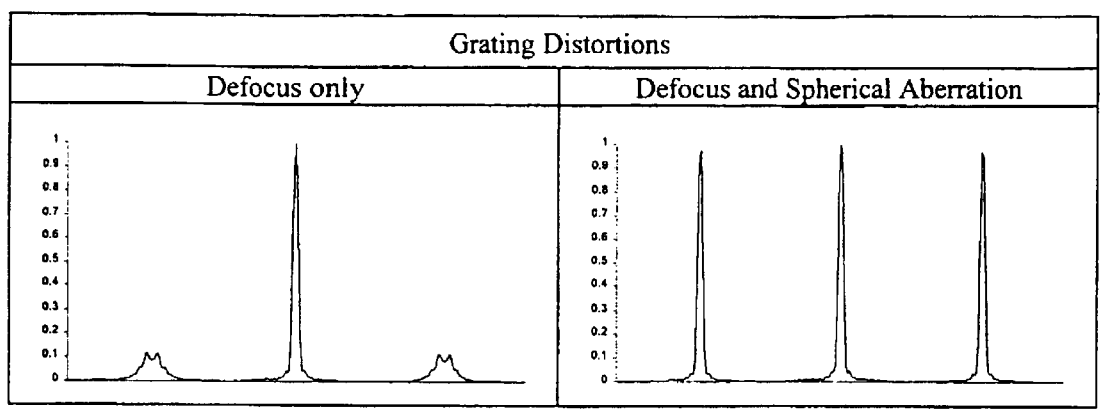
FIG. 17 shows intensity cross-sections of images of point sources on layers corresponding to 7, 6 and 5 of FIG. 14 with defocus only (left hand column) and defocus and spherical aberration (right hand column) corrected gratings.

The Y (vertical) axes in FIGS. 16 and 17 represent intensity and the X (horizontal) axes represent distance along a line through the image formed.

The operation of a grating with built-in defocus and spherical aberration correction has also been demonstrated with computer simulations. With reference to FIG. 14, consider an optical system focused and spherical aberration corrected for layer 6. Layers 7 and 5 are located approximately $100 \times 10^{-6}$ m either side of layer 6, associated with additional defocuses of, say, plus and minus one wave and additional spherical aberration of, say, plus and minus one wave. Point sources are located on each of the three planes. A grating with a purely quadratic distortion function ($_0C_{20}=1\lambda$, $_0C_{40}=0$), designed to focus the diffraction orders on layers 5, 6 and 7 (in the +1, 0 and −1 diffraction orders respectively) produces the image cross-section shown in the left hand column of FIG. 17. The images of the point sources on layers 7 and 5 are enlarged and reduced in intensity due to the uncorrected spherical aberration. A grating designed with defocus and spherical aberration correction ($_0C_{20}=1\lambda$, $_0C_{40}=1\lambda$) produces the image cross-section shown in the right hand column of FIG. 17. The spherical aberration is now corrected for all data layers and the images of the point sources are in focus and of diffraction limited size.

Shift of Quadratic Distortion Origin

Consider an undistorted grating ($_0C_{20}=_0C_{40}=_0C_{60}=0$) consisting of parallel strips of different transmissivity, reflectivity or optical thickness. The y-axis is defined to be parallel to the strips in the grating and the x-axis to be perpendicular to the strips. A plane wavefront incident normally on the grating is diffracted into orders at angles $\theta_m$ to the optical axis where, $$\sin\theta_m = \frac{m\lambda}{d} \qquad \text{Equation 16}$$

The angular deflection of each order is equivalent to introducing onto the incident wavefront a phase tilt across the grating plane of, $$\phi(x, y) = \frac{2m\pi x}{d}. \qquad \text{Equation 17}$$

When $_0C_{20}$ is non-zero the expansion of the defocus (first) term in equation 15 produces a phase shift given by, $$\phi(x, y) = \qquad \text{Equation 18}$$
$$_0C_{20}\left[\frac{2\pi m}{R^2\lambda}(x^2 + y^2) - \frac{4\pi m x_0}{R^2\lambda}x - \frac{4\pi m y_0}{R^2\lambda}y + \frac{2\pi m(x_0^2 + y_0^2)}{R^2\lambda}\right]$$

The quadratic dependence of equation 18 (all within the first term) is identical to equation 3 (the defocus phase term obtained from a grating distorted according to a quadratic function centred on the optical axis). Shifting the origin of the quadratic function therefore has no effect on the level of defocus introduced into each diffraction order.

The final term in equation 18 represents a dc phase offset which has no effect on the wavefront shape diffracted into each order.

The second term in equation 18, $$\phi(x, y) = -\frac{4m\pi}{\lambda R^2}{_0C_{20}}x_0 x \qquad \text{Equation 19}$$

represents a linear increase in phase across the x-axis of the grating plane. This phase tilt has the effect of changing the separation of the grating diffraction orders, whilst leaving the position of the zero order (m=0) and level of defocus unchanged. If $x_0$ is chosen to have a value of, $$x_0 = \frac{\lambda R^2}{2d_0 C_{20}} \qquad \text{Equation 20}$$

then equation 19 becomes equal to, $$\phi(x, y) = \frac{-2m\pi x}{d} \qquad \text{Equation 21}$$

Figure 18:
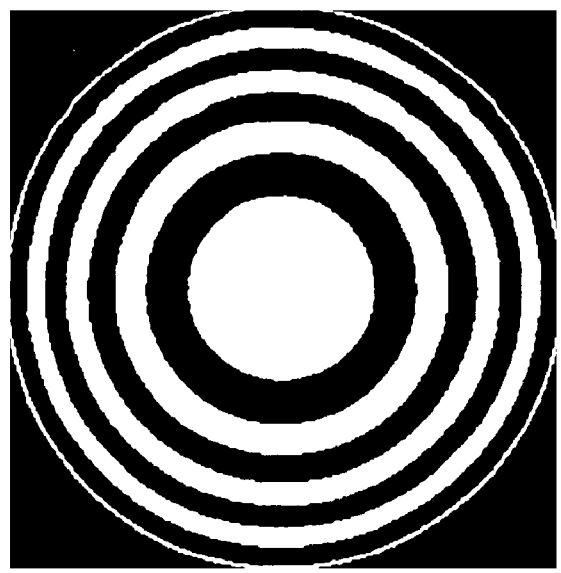
FIG. 18 shows a quadratically distorted diffraction grating with $_0C_{20}=4\lambda$ and an offset of the quadratic function relative to the optical axis of $x_0=\lambda R^2/(2\, d_0 C_{20})$.

This phase tilt is equal and opposite in sign to that introduced into light scattered from the gating structure. The cancellation of these two terms (equation 17 and equation 21) for each order causes the diffraction order spacing to become zero in a plane perpendicular to the optical axis, corresponding to all of the orders lying along the optical axis of the system. The diffraction orders remain spatially separated along the optical axis according to the level of defocus ($_0C_{20}$) within the distorted grating. The shift of the origin of the quadratic function to that defined in equation 20 leads to a grating structure consisting of circular fringes, as shown in FIG. 18. This form of grating is used as part of an illumination system described below.

The third term in equation 18, $$\phi(x, y) = \frac{4m\pi}{\lambda R^2}{_0C_{20}}y_0 y \qquad \text{Equation 22}$$

represents a linear increase in phase across the y-axis of the grating plane. This causes the diffraction orders (other than m=0) to move along the y-direction in the image plane.

Through choice of $x_0$ and $y_0$, the position of a particular diffraction order in the image plane can be controlled, whilst leaving the level of defocus and spherical aberration unchanged.

System with Equal Image Magnifications

Consider a system of the type shown in FIG. 10 in which multiple object planes are imaged onto a single image plane. In general, according to equation 10, the object planes imaged into the +1 and −1 orders (7 and 5 respectively) are not symmetrically located about the plane (6) imaged into the zero order. The magnification associated with each image ($M_m$) calculated simply as the ratio of the image distance (v) to object distance is given by, $$M_m = M + \frac{2mv_0 C_{20}}{R^2} \qquad \text{Equation 23}$$

where M is the magnification of the image associated with the zero order ($M_0$). Hence, in general the magnification of images associated with the non-zero diffracted orders is not equal to that of the zero order (for $_0C_{20}\neq 0$).

Figure 19:
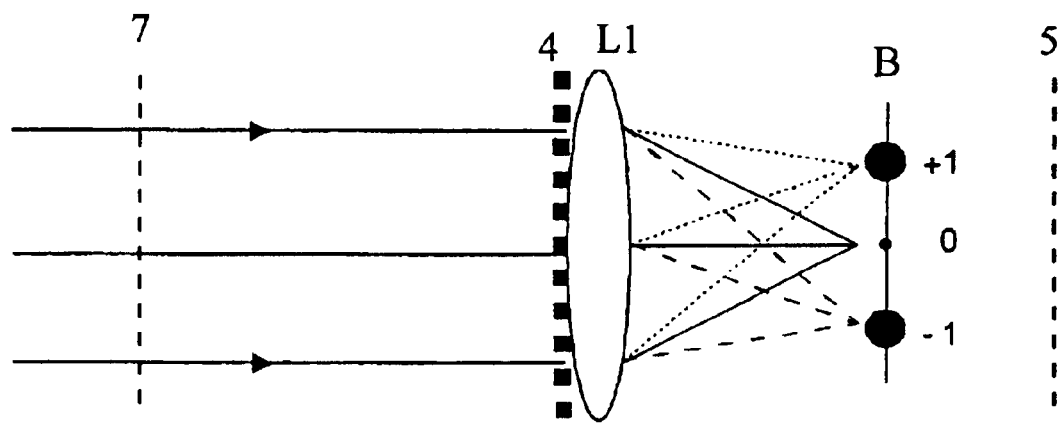
FIG. 19 shows an optical system for obtaining images of 2 or more object planes with equal magnifications.

Consider the special case of a single lens and a detector (plane B) placed one focal length from the lens so as to form an image of an object at infinity (FIG. 19). Adding a quadratically distorted grating (4) to the lens (L1) effectively decreases its focal length in the +1 diffraction order and increases its focal length in the −1 order. Using standard lens formulae with an image distance of one focal length, the object planes imaged in each diffraction order are at locations given by, $$u_m = \frac{R^2}{2m_0 C_{20}} \qquad \text{Equation 24}$$

Hence, the images corresponding to diffraction orders of equal magnitude but opposite sign (for example planes 5 and 7 in FIG. 19) are placed symmetrically, equal distances either side of the lens, while the zero order is an image of a plane at infinity. The image magnification relating to each object plane is, $$M_m = \frac{2m f_0 C_{20}}{R^2} \qquad \text{Equation 25}$$

The images corresponding to diffraction orders of equal magnitude but opposite sign therefore have magnifications of equal magnitude but opposite sign.

Broadband Operation

The angle ($\theta_m$) into which light is diffracted from a grating is proportional to the wavelength of incident light (equation 16). If a broadband illumination source is used the non-zero orders become spectrally dispersed (along the x-axis in the image plane) and the images associated with these orders become blurred. A wavelength-dependent grating period would offer one means of superimposing the images at each wavelength and preventing blur. With a standard undistorted grating this is unachievable, but a grating distorted according to a quadratic function only offers a route to achieving this.

It was shown in equation 18 that a shift in the origin of the quadratic distortion function along the x-axis causes the separation of the images in the x-direction to change, whilst leaving the defocusing power of the grating unaltered. This property can be thought of as arising from the variation in grating period along the x-axis, which is generated when the grating is distorted according to a quadratic function. The grating period (d) at a distance x from the origin of such a grating is given by, $$d = \frac{d_0 \lambda R^2}{\lambda R^2 - 2 d_{00} C_{20} x} \qquad \text{Equation 26}$$

where $d_0$ is the period at the origin of the quadratic distortion function. It is the grating period at the centre of the incident beam (the centre of the grating aperture when the full aperture is used) which defines the image positions along the x-axis in the non-zero orders. If the grating is illuminated with a beam which has a radius less than that of the grating aperture, then as the beam centre is moved across the grating to a position x along the x-axis, the separation of the images changes in proportion to the inverse of the grating period described by equation 26.

Consider a defocus grating designed to diffract light of wavelength $\lambda_1$ at a specific angle, with an undersized beam hitting the centre of the grating, where the grating period is defined as $d_0 = d_{\lambda 1}$. To equalise the diffraction angle at a second wavelength $\lambda_2$ we require, $$d_{\lambda 2} = d_{\lambda 1} \frac{\lambda_2}{\lambda_1} \qquad \text{Equation 27}$$

Using equations 26 and 27, the diffraction angles at the two wavelengths can be equalised by offsetting the $\lambda_2$ beam centre a distance $x_{\lambda 2}$ along the x-axis relative to the $\lambda_1$ beam centre where, $$x_{\lambda 2} = \frac{R^2}{2_0 C_{20} d_{\lambda 1}} (\lambda_2 - \lambda_1) \qquad \text{Equation 28}$$

Note that the required offset is proportional to $\Delta\lambda$ ($\Delta\lambda = \lambda_2 - \lambda_1$). It follows that if the input beam is dispersed across the grating at the corrected level of dispersion the images can be superimposed at all colours.

Figure 20:
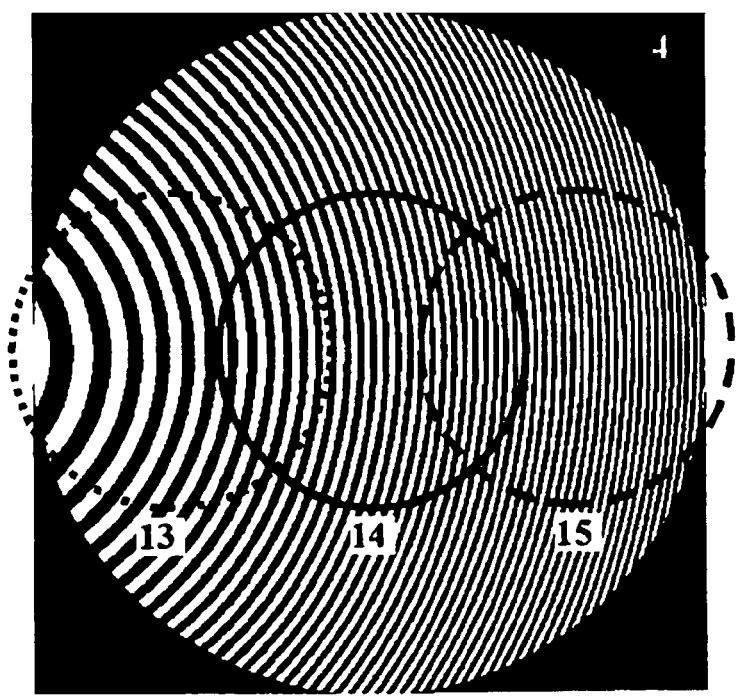
FIG. 20 shows a quadratically distorted diffraction grating and the beam positions at 3 discrete wavelengths needed to equalise the angles of diffraction.

For example, consider a grating of radius (R) 0.5 cm, grating period ($d_{\lambda 1}$) 200 μm and $_0 C_{20} = 10\lambda_1$ at 550 nm. This gives a $1^{st}$ order diffraction angle of sin θ=0.0055 radians when the beam hits the grating centrally. From equation 28, to obtain the same diffraction angle at a wavelength of 500 nm requires a beam shift of 0.313 cm, and at 600 nm a beam shift of −0.313 cm. FIG. 20 shows the beam positions at 600 nm (13), 550 nm (14) and 500 nm (15) relative to the distorted grating (4). The technique can be extended to any number of wavelengths or broadband illumination subject to equation 28 being satisfied at all wavelengths.

Figure 21:
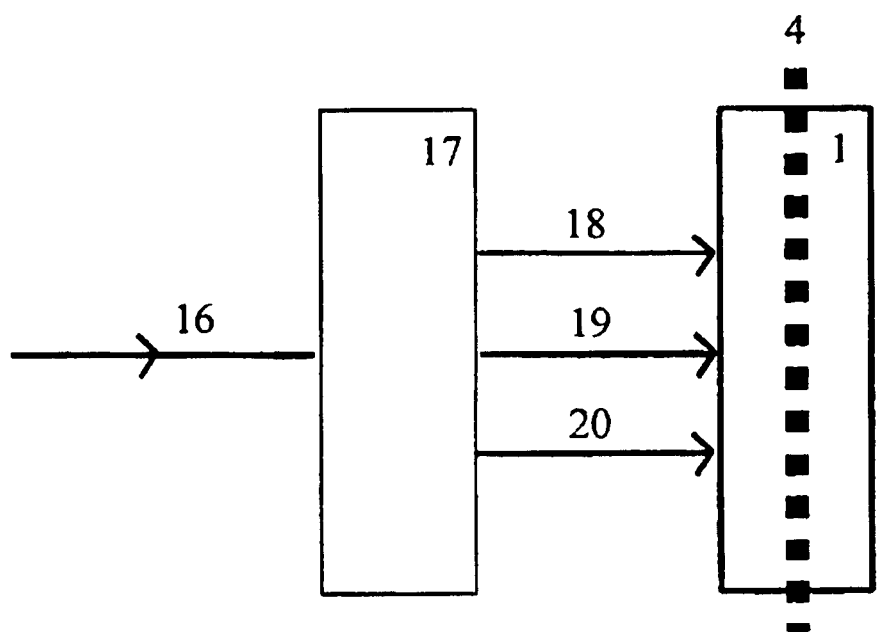
FIG. 21 is a schematic diagram of a dispersive system for introducing wavelength-dependent beam shift prior to the distorted grating.

In order to implement this technique a dispersive system can be introduced into the optical system before the distorted grating. The dispersive system must introduce a beam offset proportional to wavelength (equation 28) and leave the propagation direction equal at all wavelengths. FIG. 21 is a schematic of such a system where broadband radiation 16 which enters the dispersive system 17 is linearly translated according to wavelength with 3 discrete output wavelengths, 18, 19 and 20 from the continuous bandwidth shown. Note that the output radiation 18, 19 and 20 all follow parallel paths.

The construction of a dispersive system with the desired properties is within the knowledge of a skilled person and could be implemented, for example, by means of two blazed diffraction gratings, projecting the +1 order from the first grating onto the second grating and using the −1 order from the second grating. Another possible approach is to use a grating/prism or prism/prism combination.

Further information can be obtained from "MODERN OPTICAL ENGINEERING—The Design of Optical Systems" by Warren J, Smith, published by McGraw Hill (see especially chapter 4.3).

Illumination System

Figure 22:
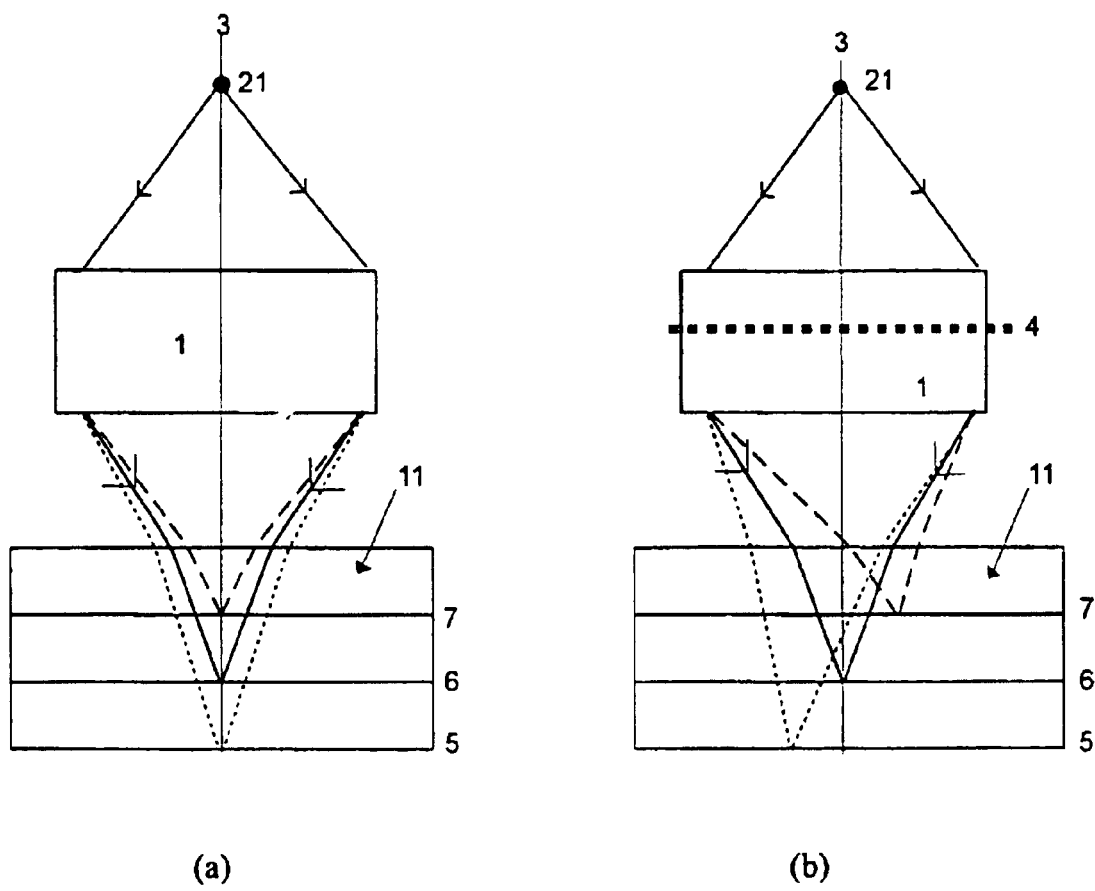
FIG. 22(a) illustrates the desired illumination of multiple layers in an object field and FIG. 22(b) illustrates illumination of such layers using gratings of the type shown in FIG. 2

In order to achieve maximum possible resolution and storage density each layer in a multi-layer data storage medium must be illuminated with a diffraction limited spot. FIG. 22a shows the distribution of light that must be achieved from the source 21. In currently proposed systems with a moveable lens (U.S. Pat. No. 5,202,875), the illumination uses the same optics as the read system. The illumination is focused at the right depth but needs additional spherical aberration correction.

The distorted grating described thus far and shown in FIG. 15, images three on-axis objects onto three spatially separated image positions (FIG. 14). If the same grating is used in an illumination system, with a single illumination source, the spots of illumination are focused on the correct layers but are laterally displaced as shown in FIG. 22b. Such a grating cannot therefore be used for both illumination and reading from a multi-layer structure.

However, using the techniques described herein, shifting the origin of the quadratic distortion function along the x-axis, through the parameter $x_0$ in equation 15, allows the diffraction orders to be aligned along the optical axis. A grating of this type (FIG. 18), incorporated into optical system 1 of FIG. 22b would produce the desired illumination shown in FIG. 22a. If the grating were additionally distorted to include the spherical aberration terms in equation 11 then the system would illuminate each data layer as shown in FIG. 22a with automatic spherical aberration correction.

Complete System

Figure 23:
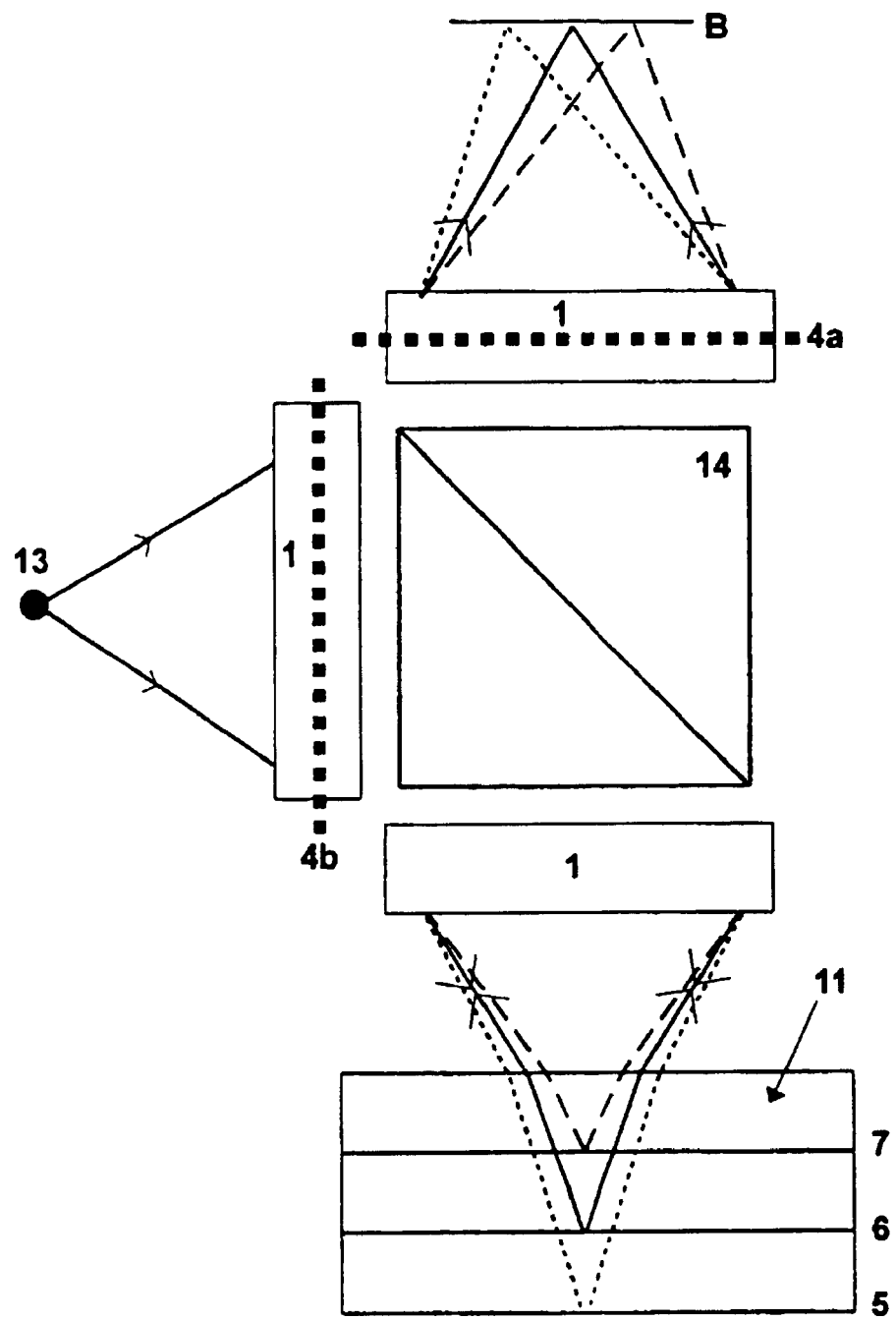
FIG. 23 is a schematic diagram of a multi-layer optical data storage read head.

Using two gratings of the type described in this invention a complete system for illumination and reading from a multi-layer optical data storage medium, with no moving parts and automatic spherical aberration correction can be described. The system is shown schematically in FIG. 23. Light from the source 13 passes through a grating 4b of the type described in the paragraph above (and FIG. 18), which produces multiple on-axis, spherical aberration corrected foci corresponding to the different data layers 5, 6 and 7. Light reflected from the data layers passes through a grating 4a of the type shown in FIG. 15c with spherical aberration correction, which produces spatially separated images of the different data layers on plane B. It is well known that a polarisation sensitive beamsplitter 14 and polarisation rotating plates can be used to minimise losses in such a system. Numeral 1 is used generally to designate an optical system.

In such a system the terms "object plane" and "image plane" can be confusing: layers 5, 6 and 7 are "image planes" according to the invention with respect to an "object plane" containing illumination source 13 and are "object planes" with respect to "image plane" B. For convenience we say that the "image planes" of one apparatus according to the invention are coincident with the "object planes" of the other.

Other embodiments of the complete system will be obvious to the skilled person: for example the illumination source 13, grating 4b and associated optical system 1 could be located on the same axis as the imaging plane B and grating 4a, located on the other side of 'object' planes 5, 6 and 7. In such an embodiment, planes 5, 6 and 7 are illuminated in transmission.

What is claimed is:

1. An apparatus for producing simultaneously a plurality of spatially separated images from a plurality of object planes, said apparatus comprising:
    an optical system arranged to produce an image associated with a first focus condition;
    a diffraction grating arranged to produce, in concert with the optical system, images associated with each diffraction order; and
    means for detecting the images, wherein the optical system, diffraction grating and detecting means are located on an optical axis and the diffraction grating is located in a suitable grating plane and the diffraction grating is distorted according to a quadratic function so as to cause the images to be formed under various focus conditions from a plurality of different object planes and said images spatially separated in a direction having a non-zero component perpendicular to the optical axis.

2. The apparatus of claim 1 where the function according to which the grating is distorted includes further terms for producing different amounts of spherical aberration in the images associated with each diffraction order.

3. The apparatus of claim 2 where the spherical aberration of images associated with each diffraction order is arranged to correct for spherical aberration associated with the different depths of substantially parallel planes in object or image space.

4. An apparatus according to claim 1, whereby the origin of the distortion function of the diffraction grating is displaced from the optical axis.

5. An apparatus according to claim 4, whereby the origin of the quadratic distortion function is displaced to cause alignment along the optical axis of the images associated with each diffraction order.

6. An apparatus according to claim 1 whereby the diffraction grating comprises a set of two or more diffraction gratings designed such that the various diffraction orders are spatially separated.

7. An apparatus according to claim 1 whereby the diffraction grating is any one of an amplitude-only diffraction grating, a phase only diffraction grating or a phase and amplitude diffraction grating.

8. An apparatus according to claim 1 whereby the diffraction grating is polarisation sensitive.

9. An apparatus according to claim 1 whereby the diffraction grating is a programmable grating.

10. An apparatus according to claim 1 whereby the diffraction grating is a reflective grating or a transmissive grating.

11. An apparatus according to claim 1 whereby the grating is any of a two-level (binary) structure, a multi-level (digitised) structure or a continuous-level (analogue) structure.

12. A wavefront analyser including an apparatus for producing simultaneously a plurality of spatially separated images from a plurality of object fields according to claim 1.

13. A passage ranging device including an apparatus for producing simultaneously a plurality of spatially separated images from a plurality of object fields according to claim 1.

14. An apparatus for producing simultaneously a plurality of spatially separated images from an object field comprising:
    an optical system arranged to produce an image associated with a first focus condition;
    a diffraction grating arranged to produce, in concert with the optical system, images associated with each diffraction order and
    means for detecting the images;
    wherein the optical system, diffraction grating and detecting means are located on an optical axis and the diffraction grating is located in a suitable grating plane and is distorted substantially according to a quadratic function so as to cause the images to be formed under various focus conditions whereby the diffraction grating comprises two gratings sensitive to different polarisations and arranged such that the diffraction orders produced by said gratings are spatially separated.

15. An apparatus for producing simultaneously a plurality of spatially separated images from a plurality of object planes, said apparatus comprising:
    an optical system arranged to produce an image associated with a first focus condition;
    a diffraction grating arranged to produce, in concert with the optical system, images associated with each diffraction order and
    means for detecting the images, wherein the optical system, diffraction grating and detecting means are located on an optical axis and the diffraction grating is located in a suitable grating plane and is distorted substantially according to a quadratic function so as to cause the images to be formed under various focus conditions and adapted for forming images on a plurality of image planes, from said plurality of object planes.

16. The apparatus of claim 15 where at least one of the object planes contains a source of illumination which is used to illuminate the image planes.

17. An apparatus for producing simultaneously a plurality of spatially separated images from an object field comprising:

an optical system arranged to produce an image associated with a first focus condition;

a diffraction grating arranged to produce, in concert with the optical system, images associated with each diffraction order and means for detecting the images, wherein the optical system, diffraction grating and detecting means are located on an optical axis and the diffraction grating is located in a suitable grating plane and the diffraction grating is distorted according to a quadratic function so as to cause the images to be formed under various focus conditions and said images spatially separated in a direction having a non-zero component perpendicular to the optical axis, adapted for producing substantially in focus images in a common image plane, from a plurality of object planes.

18. The apparatus of claim 17 wherein the object planes are coincident with the image planes.

19. The apparatus of claims 17 where each object plane contains an array of elements, capable of existing in at least two states and in which the detector means is capable of distinguishing between said states.

20. The apparatus of claim 19 adapted for reading data from a three dimensional optical storage medium wherein object planes are located within the medium and the detecting means is capable of producing a signal dependent on the state of the elements.

21. An apparatus for producing simultaneously a plurality of spatially separated images from an object field comprising:

an optical system arranged to produce an image associated with a first focus condition;

a diffraction grating arranged to produce, in concert with the optical system, images associated with each diffraction order; and means for detecting the images, wherein the optical system, diffraction grating and detecting means are located on an optical axis and the diffraction grating is located in a suitable grating plane and is distorted substantially according to a quadratic function so as to cause the images to be formed under various focus conditions and further including a dispersive system for introducing an offset to an input beam of radiation, said offset being perpendicular to the optical axis and proportional to the wavelength of the input radiation, whilst leaving the beams at each wavelength following parallel paths.

* * * * *